(12) United States Patent
Bai et al.

(10) Patent No.: US 11,009,615 B2
(45) Date of Patent: May 18, 2021

(54) TIME-OF-FLIGHT RESOLUTION-ADAPTIVE IMAGE REGULARIZATION AND FILTERING IN POSITRON EMISSION TOMOGRAPHY

(71) Applicant: KONINKLIJKE PHILIPS N.V., Eindhoven (NL)

(72) Inventors: Chuanyong Bai, Solon, OH (US); Andriy Andreyev, Willoughby Hills, OH (US); Andre Frank Salomon, Aachen (DE); Andreas Goedicke, Aachen (DE); Jinghan Ye, Livermore, CA (US); Yu-Lung Hsieh, Aurora, OH (US); Bin Zhang, Cleveland, OH (US); Xiyun Song, Cupertino, CA (US); Manoj Narayanan, Mentor, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 47 days.

(21) Appl. No.: 16/470,730

(22) PCT Filed: Dec. 18, 2017

(86) PCT No.: PCT/EP2017/083188
§ 371 (c)(1),
(2) Date: Jun. 18, 2019

(87) PCT Pub. No.: WO2018/114729
PCT Pub. Date: Jun. 28, 2018

(65) Prior Publication Data
US 2019/0339403 A1 Nov. 7, 2019

Related U.S. Application Data

(60) Provisional application No. 62/436,476, filed on Dec. 20, 2016.

(51) Int. Cl.
*G01T 1/00* (2006.01)
*G01T 1/29* (2006.01)

(52) U.S. Cl.
CPC ................... *G01T 1/2985* (2013.01)

(58) Field of Classification Search
CPC .......... G01T 1/2985; G01T 7/005; G01T 1/00
See application file for complete search history.

(56) References Cited

U.S. PATENT DOCUMENTS

| 5,331,553 A | 7/1994 | Muehllehner |
| 6,008,493 A | 12/1999 | Shao |
(Continued)

FOREIGN PATENT DOCUMENTS

| CA | 2622132 A1 | 5/2007 |
| JP | 2002501617 A | 1/2002 |
(Continued)

OTHER PUBLICATIONS

Shekari, Mahnaz et al "Optimizing Image Reconstrction parameters in Time of Flight PET/CT Imaging: A Phantom Study", Frontiers in Biomedical Technologies, vol. 2, Issue 3, Nov. 2015.
(Continued)

*Primary Examiner* — David P Porta
*Assistant Examiner* — Fani Boosalis

(57) ABSTRACT

A time of flight (TOF) positron emission tomography (PET) image (38) is generated from TOF PET imaging data (10) acquired of a subject using a TOF PET imaging data acquisition device (6). Iterative image reconstruction (30) of the TOF PET imaging data is performed with TOF localization of counts along respective lines of response (LORs) to iteratively update a reconstructed image (32). Values for at least one regularization or filtering parameter are assigned to the TOF PET imaging data or to voxels of the reconstructed image based on an estimated TOF localization
(Continued)

resolution for the TOF PET imaging data or voxels. Regularization (34) or filtering (36) of the reconstructed image is performed using the assigned values for the at least one regularization or filtering parameter. In some embodiments, the varying TOF localization resolution for the TOF PET imaging data or voxels is estimated based on related acquisition characteristics such as count rates or operating temperature of the detectors.

20 Claims, 7 Drawing Sheets

(56) References Cited

U.S. PATENT DOCUMENTS

| | | | |
|---|---|---|---|
| 8,233,682 | B2 | 7/2012 | Fessler |
| 9,316,752 | B2 | 4/2016 | Degenhardt |
| 9,474,495 | B2 | 10/2016 | Ahn |
| 2008/0304726 | A1 | 12/2008 | Fessler |
| 2010/0108896 | A1 | 5/2010 | Surti |
| 2016/0174919 | A1 | 6/2016 | Ahn |
| 2016/0327622 | A1 | 11/2016 | Ahn |

FOREIGN PATENT DOCUMENTS

| | | |
|---|---|---|
| WO | 199715841 A1 | 5/1997 |
| WO | 2014066629 A1 | 5/2014 |
| WO | 2015083050 A1 | 6/2015 |
| WO | 2015125086 A1 | 8/2015 |

OTHER PUBLICATIONS

Kotasidis, F.A. et al "Impact of time-of-Flight on Indirect 3D and Direct 4D Parametric Image Reconstruction in the Presence of Inconsistent Dynamic PET Data", Physics in Medicine and Biology, vol. 61, 2016, pp. 3443-3471.

International Search Report and Written Opinion of PCT/EP2017/083188, dated Apr. 12, 2018.

TIME-OF-FLIGHT RESOLUTION-ADAPTIVE IMAGE REGULARIZATION AND FILTERING IN POSITRON EMISSION TOMOGRAPHY

CROSS-REFERENCE TO PRIOR APPLICATIONS

This application is the U.S. National Phase application under 35 U.S.C. § 371 of International Application No. PCT/EP2017/083188, filed on Dec. 18, 2017, which claims the benefit of U.S. Provisional Patent Application No. 62/436,476, filed on Dec. 20, 2016. These applications are hereby incorporated by reference herein.

FIELD

The following relates generally to the medical imaging arts, positron emission tomography (PET) imaging and image reconstruction arts, and related arts.

BACKGROUND

In positron emission tomography (PET) imaging, a positron-emitting radiopharmaceutical is administered to a subject. Each positron-electron annihilation event produces two oppositely directed 511 keV gamma rays, which are detected as coming from a single annihilation event using coincidence detection. Particularly, the gamma ray detections are filtered to retain only those at 511 keV (within some energy window) and the 511 keV detection events are filtered using a time window to identify 511 keV pairs detected substantially simultaneously each such coincident pair is then assumed to be associated with a single annihilation event, which is located somewhere along a line of response (LOR) connecting the two detection events. In more advance reconstruction algorithms, random coincidences due to scattering or the like are corrected statistically.

In actuality, the two 511 keV detections produced by a true positron-electron annihilation event are usually not precisely simultaneous. A small finite time difference is caused by different time-of-flight (TOF) intervals for the two gamma rays to travel from the common starting point at the annihilation event to their respective detectors. Unless the annihilation event is located precisely equidistant from the two detectors, there will be a finite time difference between the two 511 keV detections due to one gamma ray having a shorter time-of-flight than the other. Conventionally, this is addressed by use of a finite coincidence detection time window, and/or is alleviated inherently due to the radiation detectors having insufficient temporal resolution to detect the small TOF time difference.

In time-of-flight (TOF) PET, the radiation detectors have sub-picosecond temporal resolution and are capable of measuring the TOF difference. In conventional PET each count along a LOR (that is, each coincident 511 keV detection pair along the LOR) merely localizes the annihilation event to having occurred somewhere along the LOR. By contrast, in TOF PET the time-of-flight information provides additional localization of each count along the LOR. The TOF information can be envisioned as a Gaussian or other peaked probability distribution along the LOR, with the Gaussian peak at a location defined by the time difference and the Gaussian width corresponding to the temporal resolution of the detectors (converted to a positional resolution using the known speed of light). In iterative TOF PET reconstruction, the TOF localization is employed to provide improved reconstructed image resolution and improved overall image quality. Some known iterative TOF PET reconstruction algorithms employ ordered subset expectation maximization (OSEM) or Maximum Likelihood Estimation Method (MLEM) to compare and optimize the (projected) reconstructed image with the projection data including TOF localization information.

The following discloses new and improved systems and methods.

SUMMARY

In one disclosed aspect, an imaging device comprises a time of flight (TOF) positron emission tomography (PET) imaging data acquisition device including one or more radiation detector modules or rings arranged to acquire TOF PET imaging data of an imaging subject. The imaging device further comprises a computer and a non-transitory storage medium storing instructions readable and executable by the computer to generate a TOF PET image by operations including: performing iterative image reconstruction of the TOF PET imaging data to iteratively update a reconstructed image; assigning values for at least one acquisition condition-dependent regularization or filtering parameter to the TOF PET imaging data or to voxels of the reconstructed image based on an estimated value of the acquisition condition for the TOF PET imaging data or voxels; and performing regularization or filtering of the reconstructed image using the assigned values for the at least one acquisition condition-dependent regularization or filtering parameter. In some illustrative embodiments, the acquisition parameter is count rate. In some illustrative embodiments, the acquisition parameter is temperature.

In another disclosed aspect, a non-transitory storage medium stores instructions readable and executable by a computer or other electronic data processing device to generate a TOF PET image from TOF PET imaging data acquired of a subject using a TOF PET imaging data acquisition device. The generation of the TOF PET image is by operations including: performing iterative image reconstruction of the TOF PET imaging data with TOF localization of counts along respective lines of response (LORs) to iteratively update a reconstructed image; assigning values for at least one regularization or filtering parameter to the TOF PET imaging data or to voxels of the reconstructed image based on an estimated TOF localization resolution for the TOF PET imaging data or voxels; and performing regularization or filtering of the reconstructed image using the assigned values for the at least one regularization or filtering parameter.

In another disclosed aspect, a method comprises: performing iterative image reconstruction of time of flight (TOF) positron emission tomography (PET) imaging data with TOF localization of counts along respective lines of response (LORs) to iteratively update a reconstructed image; estimating TOF localization resolution for the TOF PET imaging data or for voxels of the reconstructed image; and performing regularization or filtering of the reconstructed image using values for at least one regularization or filtering parameter computed based on the estimated TOF localization resolution for the TOF PET imaging data or for the voxels. The iterative image reconstruction, the estimation of TOF localization resolution, and the regularization or filtering are suitably performed by a computer.

One advantage resides in providing time-of-flight (TOF) positron emission tomography (PET) imaging with improved image quality.

Another advantage resides in providing TOF PET imaging with reduced radiation exposure to the imaging subject but without commensurate reduction in image quality.

Another advantage resides in providing TOF PET imaging with improved image regularization.

Another advantage resides in providing TOF PET imaging with improved filtering for smoothing or other beneficial image filtering adjustment.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Localization of the positron-electron annihilation event in TOF PET image reconstruction leads to reduced image noise with the same number of counts as compared to non-TOF. Viewed another way, TOF achieves an effective sensitivity gain over non-TOF. This gain is inversely proportional to the TOF resolution. In general, the higher the TOF resolution, the higher the effective gain. It is recognized herein that, because of this effective sensitivity gain, image processing such as regularization and filtering should be different for TOF and non-TOF or lower resolution TOF in order to optimize the processed image.

Regularized reconstruction employs prior knowledge as regularization on the reconstruction process. Regularization can be either edge-preserving or non-edge-preserving. It is recognized herein that when regularized reconstruction is applied to data with different TOF resolution, the TOF resolution should be considered so that the images are not under- or over-regularized.

In some illustrative embodiments disclosed herein, a TOF PET image is generated from TOF PET imaging data acquired of a subject using a TOF PET imaging data acquisition device. The TOF PET image is generated by operations including: performing iterative image reconstruction of the TOF PET imaging data with TOF localization of counts along respective lines of response (LORs) to iteratively update a reconstructed image; assigning values for at least one regularization or filtering parameter to the TOF PET imaging data or to voxels of the reconstructed image based on an estimated TOF localization resolution for the TOF PET imaging data or voxels; and performing regularization or filtering of the reconstructed image using the assigned values for the at least one regularization or filtering parameter.

In some illustrative embodiments disclosed herein, a TOF PET image is generated by operations including: performing iterative image reconstruction of the TOF PET imaging data to iteratively update a reconstructed image; assigning values for at least one count rate-dependent regularization or filtering parameter to the TOF PET imaging data or to voxels of the reconstructed image based on an estimated count rate for the TOF PET imaging data or voxels; and performing regularization or filtering of the reconstructed image using the assigned values for the at least one count rate-dependent regularization or filtering parameter. This approach is motivated by the recognition herein that TOF localization resolution varies with count rate, at least for some TOF PET imaging devices. Moreover, the TOF localization resolution may vary with other characteristics during the acquisition, such as the operating temperature of the detectors.

Figure 1:
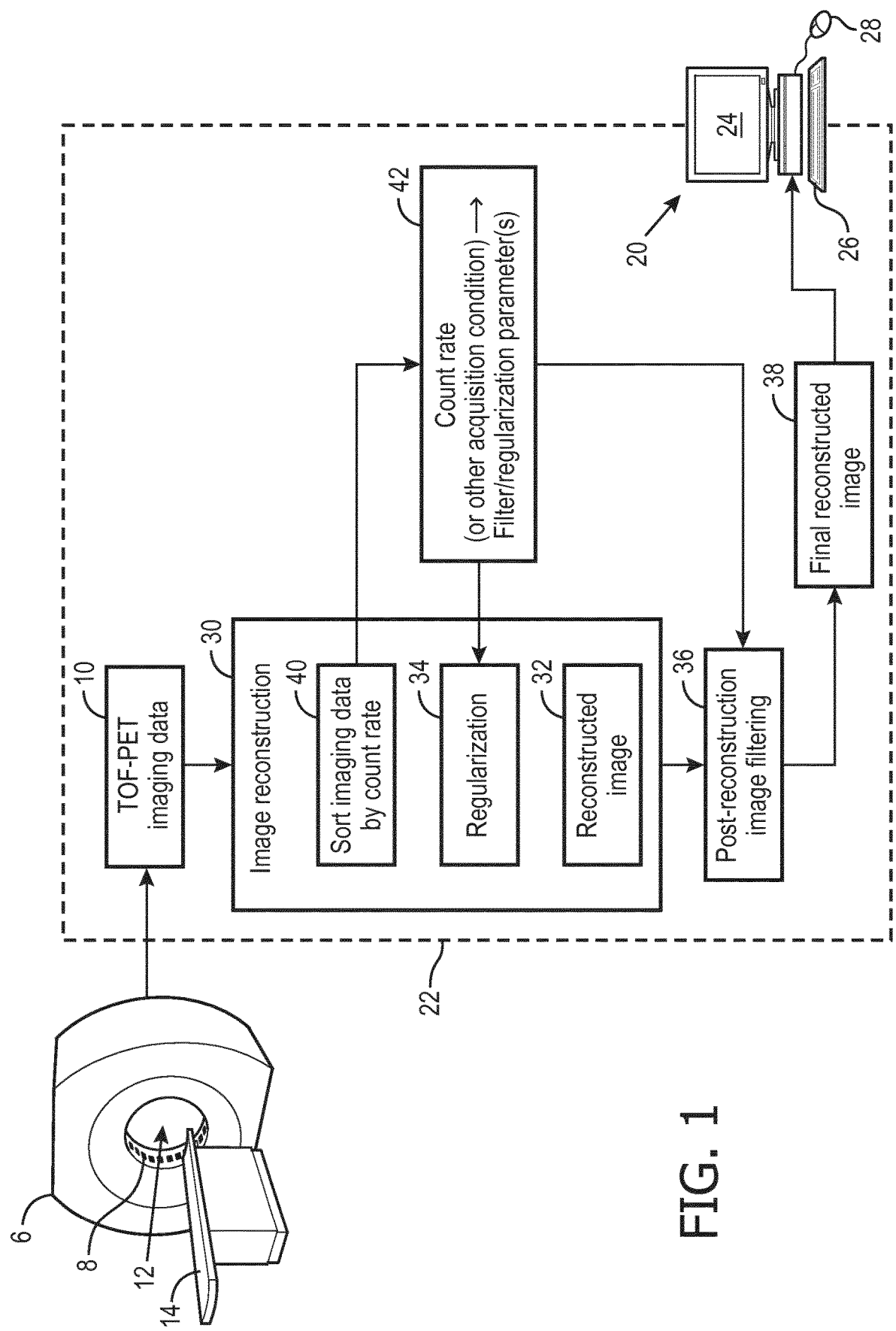
FIG. 1 diagrammatically illustrates a time-of-flight (TOF) positron emission tomography (PET) imaging system including an imaging device and an image reconstruction/processing device as disclosed herein.

With reference to FIG. 1, an illustrative time-of-flight (TOF) positron emission tomography (PET) imaging device comprises a TOF PET imaging data acquisition device (also sometimes referred to as a PET scanner) 6 that includes one or more radiation detector rings 8 arranged to acquire TOF PET imaging data 10 of an imaging subject (not shown) who is loaded into an examination region 12 of the PET scanner 6, e.g. using an illustrative axially movable patient support 14. An electronic processor 20 is programmed to process TOF PET imaging data 10 to generate one or more reconstructed TOF PET images. Processing performed by the electronic processor 20 is diagrammatically indicated in FIG. 1 by way of a dashed box 22 enclosing blocks graphically representing data and operations of the processing flow. The PET detector array 8 acquires counts of oppositely directed 511 keV gamma ray pairs along lines of response (LORs). The counts include time of flight (TOF) localization. By way of some non-limiting illustrative examples, the illustrative PET imaging scanner 6 may be the PET gantry of a Vereos™ Digital PET/CT scanner or an Ingenuity™ TF PET scanner, both available from Koninklijke Philips N.V., Eindhoven, the Netherlands. It may be noted that while the PET detector array 8 is shown as a detector array ring which is visible on the inside circumference of the bore of the PET scanner 6, this is for illustrative purposes and more typically the PET detector array is occluded from view by a cosmetic bore liner or the like which passes 511 keV radiation.

The electronic processor 20 may, for example, be embodied as a computer 20 (e.g. a desktop computer, network-based server computer, a dedicated PET control computer, various combinations thereof, or so forth) that executes instructions read from one or more non-transitory storage media (e.g. one or more hard drives, optical disks, solid state drives or other electronic digital storage devices, various combinations thereof, or so forth) that stores the instructions. The computer 20 typically includes or has operative access to at least one display 24 (e.g. an LCD display, plasma display, or so forth), and may also optionally include or have operative access to at least one user input device via which a user can input information. The illustrative user input devices include a keyboard 26 and a trackpad 28; some other typical user input devices include a mouse, a touch-sensitive overlay of the display 24, and/or so forth.

The TOF PET image generation includes an iterative TOF PET image reconstruction process 30 that performs iterative updates of a reconstructed image 32. The iterative image reconstruction process 30 may for example employ ordered subset expectation maximization (OSEM) or Maximum Likelihood Estimation Method (MLEM) to compare and optimize the (projected) reconstructed image 32 with the projection data 10 including TOF localization information. To start the process, the reconstructed image 32 is initialized for the initial iteration to some starting image, e.g. a uniform-intensity image or a more complex initial image based on prior information. Successive iterations of the iterative reconstruction process 30 successively improve fidelity between the reconstructed image 32 and the TOF PET imaging data 10, and the iterative process terminates when some stopping criterion is satisfied, such as an iteration-over-iteration change being smaller than some threshold.

The iterative image reconstruction process 30 may optionally employ regularization 34. For example, each update step of the iterative image reconstruction 30 may include applying an edge preserving prior as the regularization 34. As a non-limiting illustrative example, the edge preserving prior may be a Relative Difference Prior (RDP). By way of illustration, an update step employing MLEM with a RDP can be written as:

$$\lambda_j^{n+1} = \lambda_j^n + \frac{\lambda_j^n}{s_j}$$

$$\underbrace{\frac{1}{t_j}\left[\sum_{i=1}^{N} y_i \log\left(\sum_{j=1}^{p} a_{ij}\lambda_j^n + r_i\right) - \left(\sum_{j=1}^{p} a_{ij}\lambda_j^n + r_i\right)\right]}_{MLEM} - \underbrace{\frac{\lambda_j^n}{s_j}\frac{\partial}{\partial \lambda_j}\left[\sum_{k \in N_j} \beta_{kj}^* \frac{(\lambda_j - \lambda_k)^2}{\lambda_j + \lambda_k + \gamma|\lambda_j - \lambda_k|}\right]}_{RDP\text{-Penalizer}} \quad (1)$$

where $\lambda_j$ is the estimated activity at voxel index j, $$\beta_{kj}^* = \frac{w_k \beta_j}{\sum_{\forall k} w_k}$$

is a local penalty weighting factor, $a_{ij}$ is the system matrix value, i.e., the contribution of voxel j to projection data index i, $s_j$ the total scanner sensitivity at voxel j scaled with the acquisition time, and parameter $\gamma>0$ for steering the Gibbs prior (responsible for edge preservation threshold). In general, a larger $\gamma$ produces greater edge preservation. The value $\gamma=0$ eliminates edge preservation entirely, and the RDP becomes a quadratic prior. Said another way, employing Equation (1) as the update step with $\gamma=0$ performs the image reconstruction with a non-edge preserving quadratic prior as the regularization 34.

In some embodiments, the reconstructed image 32 resulting after the iterative image reconstruction 30 is complete (e.g. reaches a stopping criterion) is further processed by post-reconstruction image filtering 36. For example, as one non-limiting illustrative example, Gaussian filtering may be employed as the low-pass post-reconstruction image filtering 36 so as to smooth out high frequency noise artifacts.

The iterative TOF PET image reconstruction 30 and optional post-reconstruction filtering 36 produces a final reconstructed image 38, which may be displayed on the display 24, processed to determine standardized uptake value (SUV) functional information, analyzed by a physician to identify malignant lesions, or so forth.

With continuing reference to FIG. 1, in addition to leveraging TOF information in the iterative image reconstruction updates (e.g. as per Equation (1)), the accuracy of TOF information defined as TOF localization resolution is also leveraged in image regularization and/or filtering. To this end, in an operation 40 the imaging data are sorted by TOF localization resolution or a surrogate for this resolution, such as count rate. The sorting may be per-count, or may be a binned sorting in which the imaging data 10 are binned by time (useful when the TOF resolution varies with time, e.g. due to fast diminishing count rate due to short half-life of the utilized radiopharmaceutical), by spatial location (useful when the count rate varies along the axial direction so that different PET detector rings operate with different count rates), or so forth. A transform 42 operates to determine one or more filter or regularization parameters from the TOF localization resolution (or from a surrogate for this resolution, such as count rate, temperature or other acquisition condition that affects the TOF localization resolution).

Count rate, temperature or other acquisition condition-dependent regularization parameter(s) determined from the transform 42 may be used in the regularization 34. In regularized reconstruction, local information, such as local reconstruction intensity, local count density, etc., can be used to adaptively adjust the regularization parameters. However, when the TOF localization resolution is dependent upon the count rate, then even with the same (or similar) local count density, the regularization will lead to different solutions, and could be suboptimal when the effective TOF sensitivity gain is not considered. Adjusting the regularization parameters with the TOF resolution can, in contrast, make the images more consistent and optimal. In one non-limiting illustrative example, the OSEM update step with RDP regularization of Equation (1) can be modified to be count rate-dependent by replacing the edge preservation threshold $\gamma$ with an edge preservation threshold $\gamma^*_j$ which incorporates TOF localization resolution according to:

$$\gamma^*_j = \gamma\sqrt{(G_\sigma \times \lambda)_j \cdot s_j \cdot g_{TOF}} \quad (2)$$

where again $\lambda_j$ is the estimated activity at voxel index j, $G_\sigma$ is a Gaussian filter kernel of FWHM $\sigma$, $s_j$ is again the total scanner sensitivity at voxel j scaled with the acquisition time, and $g_{TOF}$ is the time-of-flight gain factor, often defined as:

$$g_{TOF} = \frac{D}{1.6 \cdot \Delta x} \quad (3)$$

where D is the patient size in the transverse plane and $\Delta x < D$ is the TOF kernel size (e.g., for a TOF resolution of 320 picoseconds, $\Delta x = 0.5 \cdot c \cdot (320 \text{ ps}) = 4.8$ cm where $c = 3.00 \times 10^8$ m/s is the speed of light in air. The factor of 0.5 comes from the spatial uncertainty being ±Δx.

TOF resolution (e.g., count rate-dependent) filtering parameter(s) may additionally or alternatively be used in the post-reconstruction image filtering 36. In this way, the regularization and/or filtering is tuned for the TOF localization resolution, so as to provide improved image quality. In other embodiments, the radiopharmaceutical dosage is decreased with the resultant reduction in signal and signal-to-noise ratio (SNR) is compensated by the effective sensitivity gain achieved by TOF localization resolution-tuned regularization and/or TOF localization resolution-tuned filtering.

In the following, some illustrative examples are provided.

Figure 2:
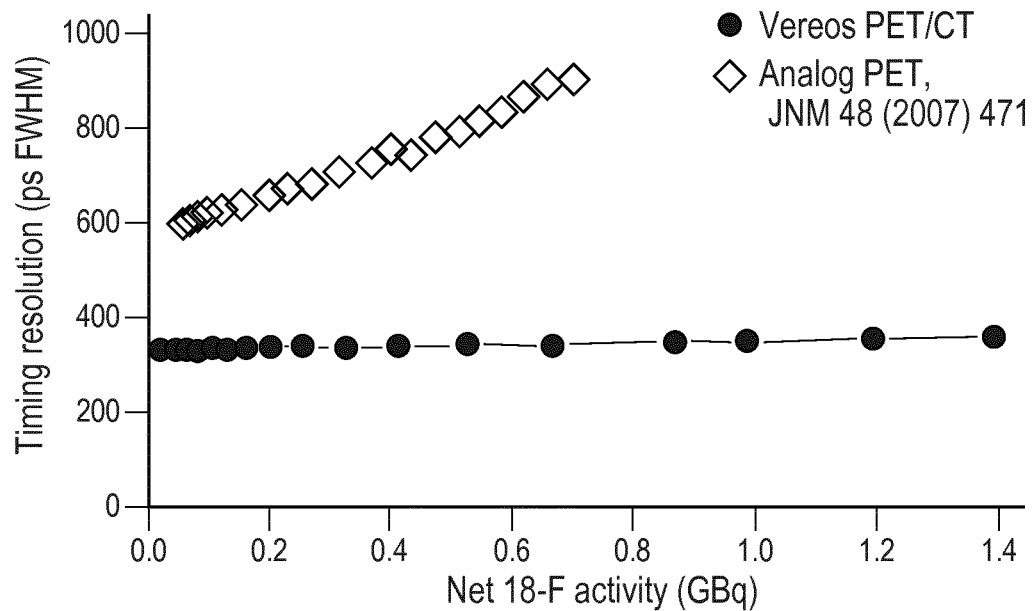
FIG. 2 presents data on impact of count rate on timing resolution for digital and analog TOF PET systems.

With reference to FIG. 2, the TOF localization resolution decreases with increasing count rate for some TOF PET imaging data acquisition devices. For example, as shown in FIG. 2, analog TOF PET detectors have been observed to exhibit poorer TOF localization resolution (i.e. more coarse, i.e. larger, time resolution values) as the count rate increases (as measured in FIG. 2 by net $^{18}$F radioactivity measured in GBq). These results for analog TOF PET detectors are described in further detail in Surti et al., "Performance of Philips Gemini TF PET/CT Scanner with Special Consideration for Its Time-of-Flight Imaging Capabilities", Journal of Nuclear Medicine vol. 48 no. 3, pp. 471-80 (2007). Without being limited to any particular theory of operation, this is believed to be due to less sharp ramp times in the 511 keV gamma ray detections at higher count rates and increased noise/interference from temporally neighboring counts. By contrast, FIG. 2 illustrates that the TOF localization resolution is nearly constant as a function of count rate for the Vereos™ Digital PET/CT scanner. Note that potentially other factors may also impact the TOF resolution such as the operating temperature of the PET detector ring, which may vary during the given acquisition if adequate temperature control is not provided for whatever reason. In view of the results of FIG. 2, it is recognized herein that for some TOF PET data acquisition devices, count rate and other factors (such as operating temperature of the detectors) is an effective surrogate for TOF localization resolution, with higher count rates (or for example higher operating temperature) corresponding to poorer TOF localization resolution. In view of this, the examples of FIGS. 3-6 employ various sorting approaches for the operation 40 of FIG. 1 to optimize regularization and/or filtering respective to the TOF localization resolution as indicated by count rate and other factors.

Figure 3:
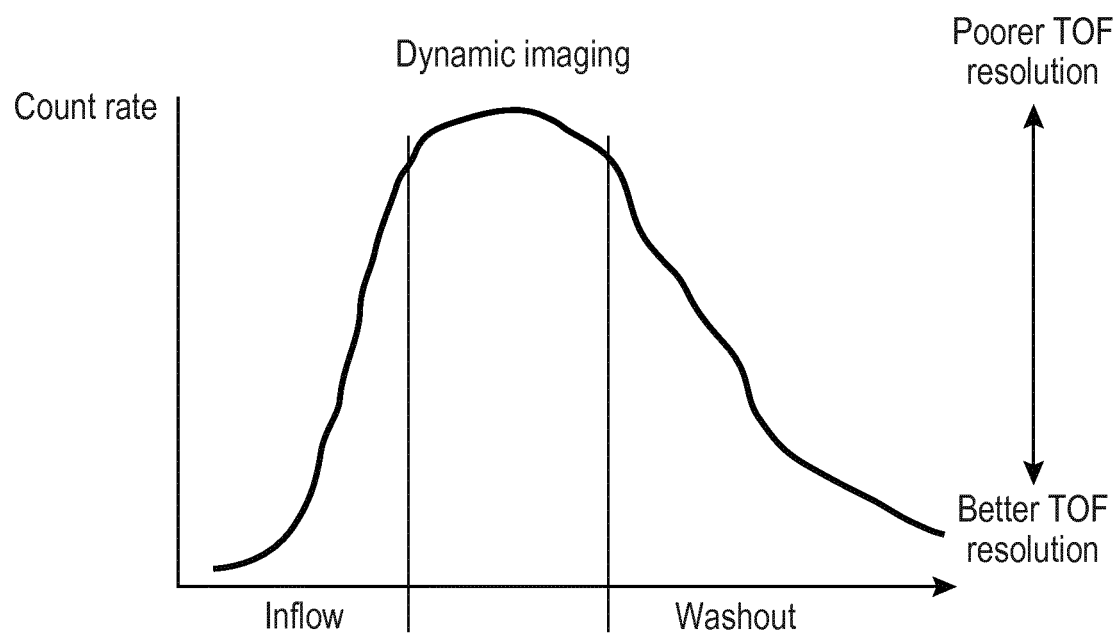
FIGS. 3-6 diagrammatically illustrate several circumstances in which statistical count rate varies predictably with imaging time and/or spatial location.

With reference to FIG. 3, for filtering of images from different dynamic phases is usually optimized for each phase according to the total counts in the corresponding phase. However, the count rate for early phases can be much higher than the later phases, if the TOF resolution varies significantly with the count rate, then the TOF resolution-related parameter should be used in addition to the total counts for the filtering of the image at each phase. For example, FIG. 3 shows a dynamic imaging example in which a radiopharmaceutical is administered intravascularly. The radiopharmaceutical flows into an organ or tissue of interest (the "Inflow" phase of FIG. 3), and subsequently flows out of the organ or tissue of interest (the "Washout" phase of FIG. 3). As plotted in FIG. 3, the dynamic imaging produces an initially low count rate that increases rapidly during the "Inflow" phase, and then decreases rapidly during the "Washout" phase. If the TOF PET imaging data acquisition device is one in which TOF localization resolution degrades significantly when the count rate increases, then as indicated at the right of FIG. 3 the TOF localization resolution will be best at the beginning of the "Inflow" phase and at the end of the "Washout" phase. The TOF localization resolution will be poorest in the central period when the concentration of radiopharmaceutical in the organ or tissue, and hence the count rate, is highest. In a dynamic imaging task such as that of FIG. 3, the sorting operation 40 suitably bins the imaging data by time intervals. The count rate for each time bin is assigned based on the total counts divided by the time interval (i.e. the average count rate for the bin), and the transform 42 then assigns filter and/or regularization parameters appropriate for the count rate of each time bin. In one approach, each time bin is then reconstructed to create a time interval image, using filter and/or reconstruction parameter(s) appropriate for the count rate of that time bin. Note that depending upon whether the regularization or filtering is performed on the imaging data or on the reconstructed image, the count rate-dependent parameters may be assigned to the imaging data or to voxels of the reconstructed time bin image. For an image voxel, the count rate at an average acquisition time of TOF PET imaging data contributing to the voxel may be used. In this way, the filtering parameter is adjusted to avoid over-filtering of the images with lower count rate (and hence higher sensitivity due to better TOF localization resolution). An empirical relation between timing resolution (converted to TOF localization resolution using the speed of light) and count rate such as that of FIG. 2 can be used to estimate the TOF resolution corresponding to time bin.

Figure 4:
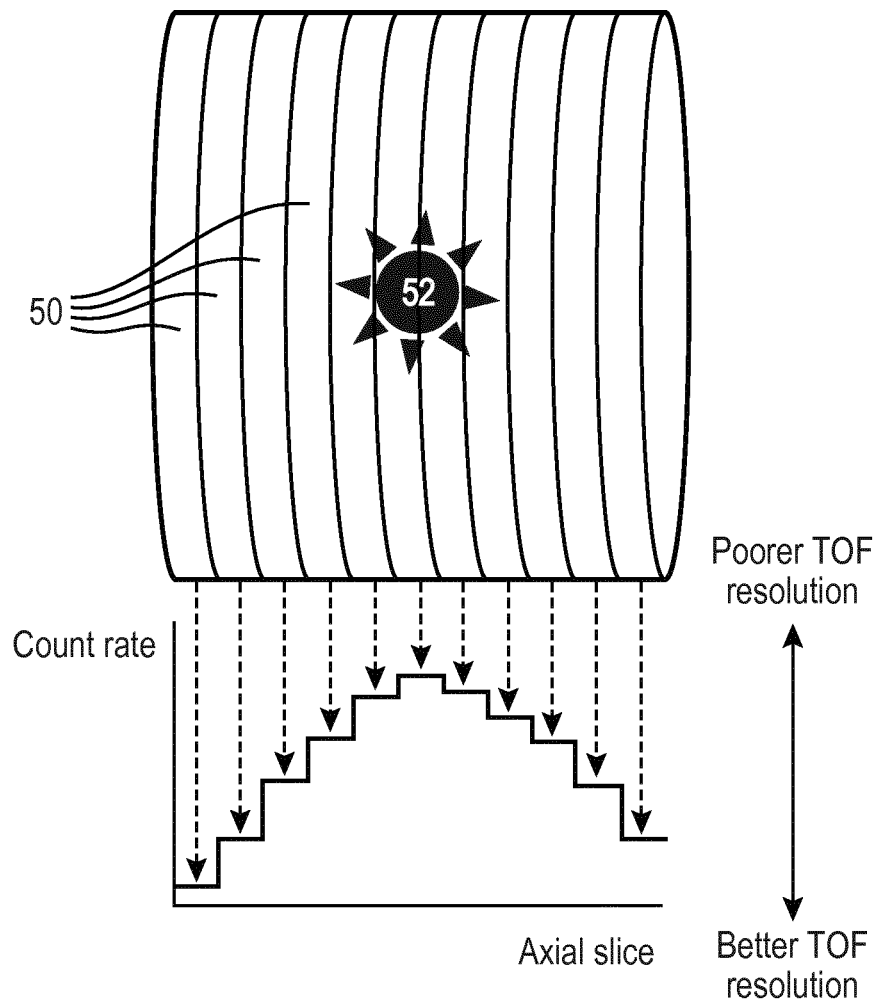

With reference to FIG. 4, in another example a set of TOF PET detector rings 50 is used to image a hot spot 52 diagrammatically indicated as located at the center of the assembly of detector rings 50. As diagrammatically plotted at the bottom diagram of FIG. 4, the central detector rings will experience a much higher count rate than the (axially) peripheral rings, because the hot spot 52 is located in the plane of the central rings. Thus, the central detector rings can be expected to have poorer TOF localization resolution and the peripheral detector rings can be expected to have better TOF localization resolution. The count rate can in this case be determined empirically for each detector ring, or estimated based on known hot spot and detector array geometries.

Figure 5:
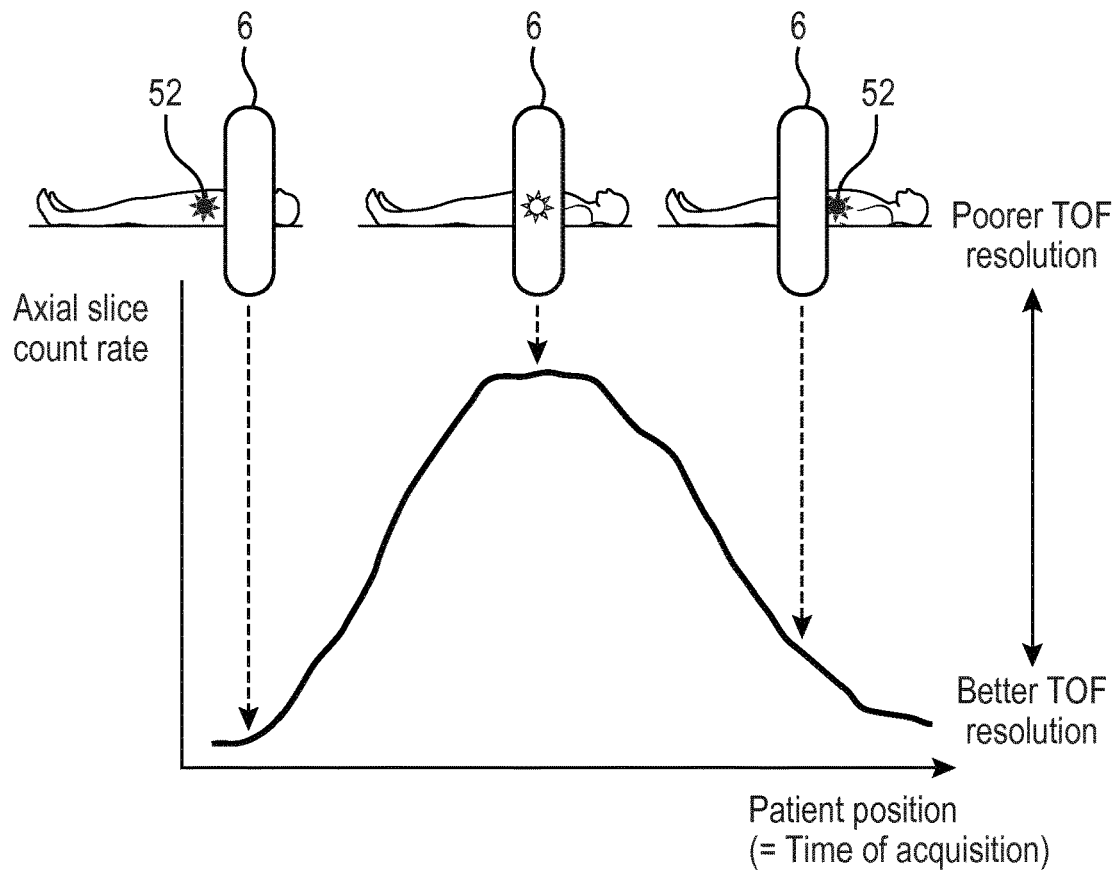

With reference to FIG. 5, in another example the hot spot 52 is moved in the axial direction through the TOF PET imaging data acquisition device 6, e.g. using the illustrative patient support 14 shown in FIG. 1. As diagrammatically plotted at the bottom diagram of FIG. 5, the count rate will be initially low, and will ramp up and eventually peak as the hot spot 52 passes through the center of the imaging data acquisition device 6, and thereafter will ramp down again as the hot spot 52 moves out of the examination region of the data acquisition device 6. For a TOF PET imaging data acquisition device that has reduced TOF localization resolution at higher count rates, this translates to the TOF resolution being best at the beginning and end of the axial patient transfer, and to the TOF resolution being poorest during the central portion of the axial patient transfer. If the acquired imaging data are binned by time (corresponding to axial slice due to the axial movement of the patient), then the various time bins can be reconstructed to generate corresponding image slices using regularization and/or filter parameters that are appropriate for the TOF localization resolution as indicated by the surrogacy of count rate. Again, depending upon whether the regularization or filtering operates on the imaging data (i.e. in LOR space) or on the reconstructed image, the count rate-dependent parameters may be assigned to the imaging data or to the voxels of the reconstructed time bin image.

Figure 6:
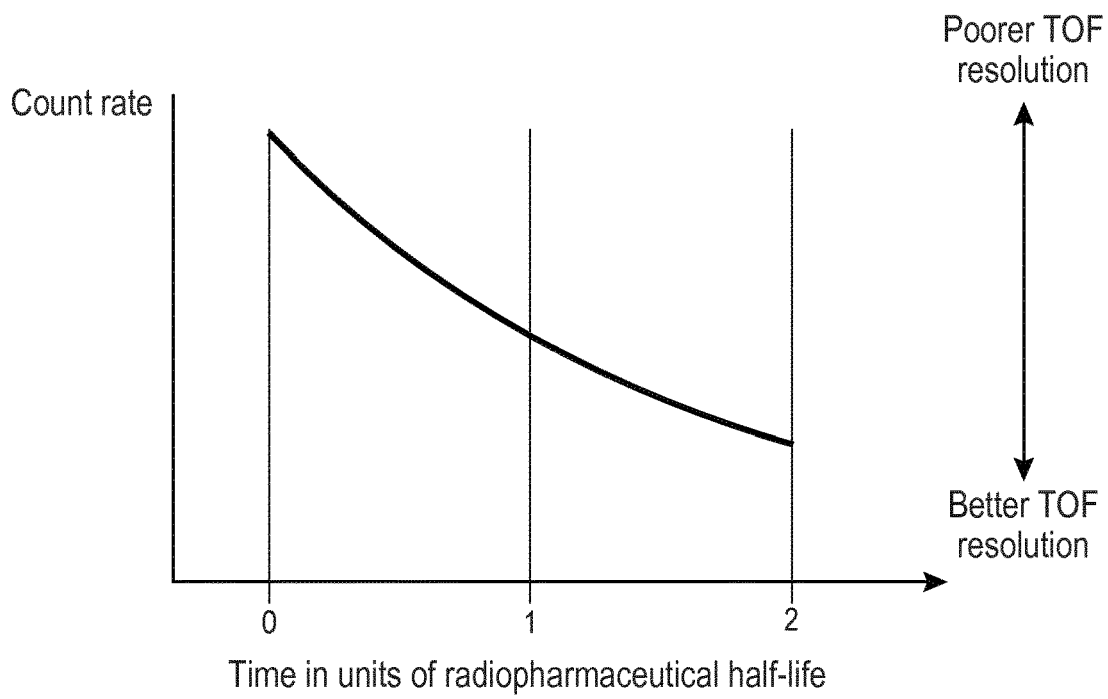

With reference to FIG. 6, in yet another example the TOF PET imaging is performed using a radiopharmaceutical which has a relatively short half-life. The count rate decreases by a factor of two over each half-life interval, as plotted in FIG. 6. If the TOF PET imaging data acquisition spans a time interval corresponding to two half-life intervals, as in the illustrative example of FIG. 6, this corresponds to the count rate decreasing by fourfold over the imaging acquisition time. Again, if the TOF PET imaging data acquisition device has reduced TOF localization resolution at higher count rates, this translates to the TOF resolution being poorest at the beginning of the imaging acquisition time interval and being best at the end of the imaging data acquisition time interval. The sorting 40 can thus sort the data into time bins with count rate-dependent regularization and/or filtering parameters being assigned values by the transform 42 in accord with the reduced activity of the radiopharmaceutical as plotted in FIG. 6. Yet again, depending upon whether the regularization or filtering operates on the imaging data or on the reconstructed image, the count rate-dependent parameters may be assigned to the imaging data or to the voxels of the reconstructed time bin image.

Figure 7:
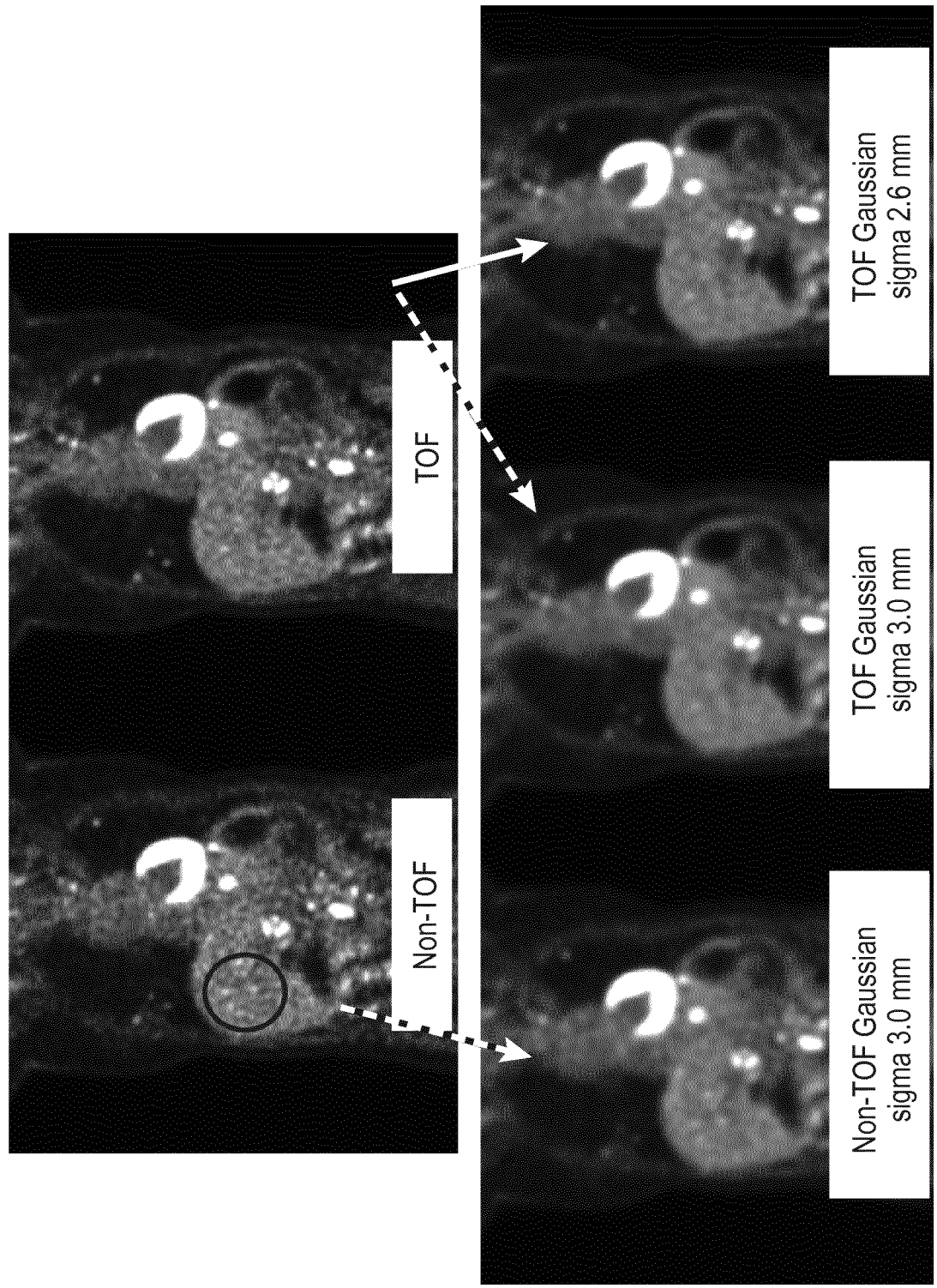
FIGS. 7 and 8 illustrate phantom imaging results as described herein.

With reference now to FIG. 7, imaging results are presented employing TOF localization resolution-dependent post-reconstruction filtering. This example includes the regular filtering of a single volumetric image. Conventionally, the filter is optimized for the count level associated with the study. But when TOF information is available, as disclosed herein the related TOF resolution value is used to adjust the filter/regularization parameters so that the image is not unnecessarily over-filtered. In one embodiment, the exact form of filter parameters adjustment can be realized through one-time calibration of the images reconstructed from the data with variable TOF-resolution. FIG. 7 gives an example when TOF resolution is used to adjust the filtering parameter of a TOF image. The top row of FIG. 7 shows the same patient study reconstructed without (left) and with (right) TOF (325 ps resolution) used in the iterative reconstruction update. The TOF image on the right is seen to be less noisy than the non-TOF image on the left.

With continuing reference to FIG. 7, the bottom row of images show images with 3D Gaussian post-reconstruction filtering. The lefthand image shows the post-reconstruction filtered non-TOF image, with sigma of 3.0 mm. The middle image shows the post-reconstruction filtered TOF image, also with sigma of 3.0 mm. The righthand image shows the post-reconstruction filtered TOF image, with sigma adjusted (reduced) using the TOF information to a value of 2.6 mm. The TOF image filtered with sigma of 3.0 mm (middle image) is seen to be un-necessarily smoothed when using the same filtering (with sigma of 3.0) as for non-TOF image (left image). With TOF-resolution adjusted post-reconstruction Gaussian filtering (right image), the image resolution is better preserved as compared to the non-adjusted case (middle image) while the liver noise level is comparable to that of the filtered non-TOF image (bottom right vs bottom left). For quantitative details, the region of interest (ROI, circle in top left image) statistics in the reconstructed images (mean, standard deviation) was (261.5, 26.5), (263.7, 21.6) for the non-TOF and TOF images, respectively, and (262.2, 19.4), (264.4, 16.5), and (264.0, 18.3). In sum, the post-reconstruction filtered image using the TOF localization resolution-adjusted filtering parameter (sigma of 2.6 mm) has better preservation of structures than without the TOF adjustment (sigma of 3.0 mm). In the example of FIG. 7, a conventional 3D Gaussian filter is used. The sigma of the Gaussian is reduced for the image reconstructed with TOF as compared to without TOF because the former is less noisy than the latter (associated with the effective sensitivity gain of TOF).

Use the TOF localization resolution adjustment for other post-reconstruction filtering is contemplated. For example, such adjustment can be used in axial weighted Gaussian filtering for single-frame cardiac image to achieve similar noise property along the axial direction in the reconstructed volume image. For different patient size, dose injection, waiting time, etc., the count rate can be very different. If the same filter is used with optimization for large patients with relatively low count rate and total counts, it will lead to unnecessary over-filtering of the small patient image. As disclosed herein, to remedy this unnecessary over-filtering, when adjusting the filtering parameters the total counts and the TOF localization resolution at the corresponding count rate are both considered for the small patients. Similarly, a filter developed for a low temporal resolution TOF system is preferably adjusted for the improved TOF resolution when used for a higher-resolution TOF system if the total counts are the same, otherwise the image from the latter can be unnecessarily over-filtered.

The disclosed TOF localization resolution adjustment is also suitable for adjusting regularized post-reconstruction filtering. Post-reconstruction resolution recovery with regularization (PSF with regularization) and regularized edge-preserving filtering, such as adaptive diffusion filtering, can each benefit from incorporating the TOF localization resolution information into the regularization parameters so that the performance can be more consistent for different count rates and between systems with different TOF resolution.

The disclosed TOF localization resolution adjustment is also suitable for adjusting in-reconstruction filtering and relaxation. In-reconstruction filtering of the intermediate images in iterative reconstruction is used for noise suppression and convergence control. Similarly, relaxation approaches by mixing images from the current and previous iterations using a relaxation factor is also used for noise and convergence control. Using TOF localization resolution information to adjust the filtering parameters and the relaxation parameters can improve the reconstructed image quality and consistency between scans at different count rates or between studies on PET systems with different TOF resolution. In general, higher (i.e. better, spatially smaller) TOF localization resolution calls for less filtering or smaller relaxation when reconstructing data with the same or similar total counts.

The disclosed TOF localization resolution adjustment is also suitable for adjusting blob parameters in blob based reconstruction. Blob-based reconstruction provides an advantageous approach for noise suppression. In general, with larger blobs, noise will be more effectively filtered but also with the risk of smoothing out the useful information. If the blob parameters are optimized for data without TOF localization, or for data with low-resolution TOF localization, then data with high-resolution TOF processed using those blob parameters will be over-filtered. If the TOF localization resolution information is incorporated in the blob parameter optimization process, however, the results will be more consistent and optimized. When the iterative image reconstruction 30 employs blobs, the blob size effectively defines the performed regularization 34, as the blob size is typically chosen to reflect prior knowledge as to the expected minimum size of real features. In these embodiments, the blob size parameter can be viewed as the TOF localization resolution-dependent regularization parameter. In general, larger values for the blob size parameter are assigned for poorer estimated TOF localization resolution (so as to provide stronger filtering), while smaller values for the blob size parameter are assigned for greater estimated TOF localization resolution (so as to provide weaker filtering).

Figure 8:
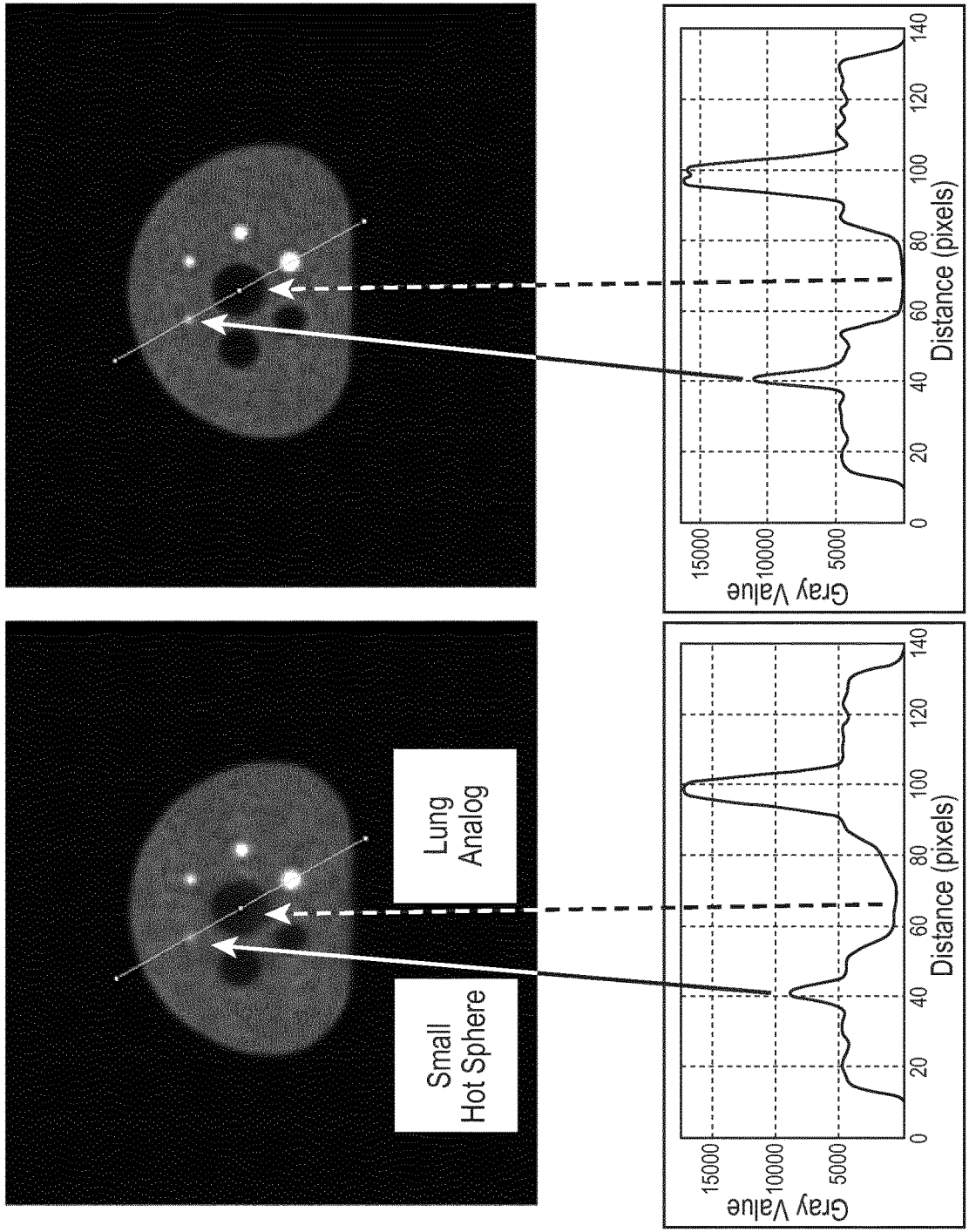

With reference to FIG. 8, NEMA IQ phantom imaging results using blob-based reconstruction are presented. The upper left image of FIG. 8 shows reconstruction using the blob parameters optimized for a low-TOF-resolution PET system for the reconstruction of data acquired on a high-TOF-resolution system. As seen in the upper left image of FIG. 8, this leads to overly filtered image that had decreased small hot sphere and lung analog contrast. By contrast, the upper right image of FIG. 8 shows reconstruction using the blob parameters optimized for the high-TOF-resolution PET system in reconstruction of the same data acquired on the high-TOF-resolution system. When using the TOF adjusted blob parameters (upper right image of FIG. 8), the image showed improved small hot sphere contrast and lung analog contrast in the NEMA IQ phantom study. The two upper images also have superimposed lines, along which profiles were plotted as shown in the corresponding two bottom plots.

FIG. 8 illustrates that for the same data acquired on a high-resolution TOF system, if reconstructed using the blob setting optimized for a low-resolution TOF system, the image was unnecessarily over-filtered, leading to reduced contrast of the small sphere and the lung analog in the NEMA IQ phantom (upper left image and corresponding bottom left profile plot). Using TOF adjusted blob parameters, however, the image showed much improved contrast of the small lesion and the lung analog (upper right image and corresponding bottom right profile plot). In general, smaller blob size is used for reconstruction of TOF data with higher TOF localization resolution (i.e. better resolution, spatially smaller TOF localization) with the same or similar counts.

If a TOF PET imaging data acquisition device has stable TOF localization resolution (e.g. as for the Vereos™ PET of FIG. 2), the blob parameters can be optimized once for the device. However, if the TOF localization resolution varies significantly with acquisition parameters such as count rate, temperature or other factors (e.g. as for the analog PET of FIG. 2), then the TOF resolution is acquisition parameters (count rate, temperature, etc) dependent and the blob parameters are preferably adaptive to the TOF resolution at the corresponding acquisition factors for optimal blob-based reconstruction.

Figure 9:
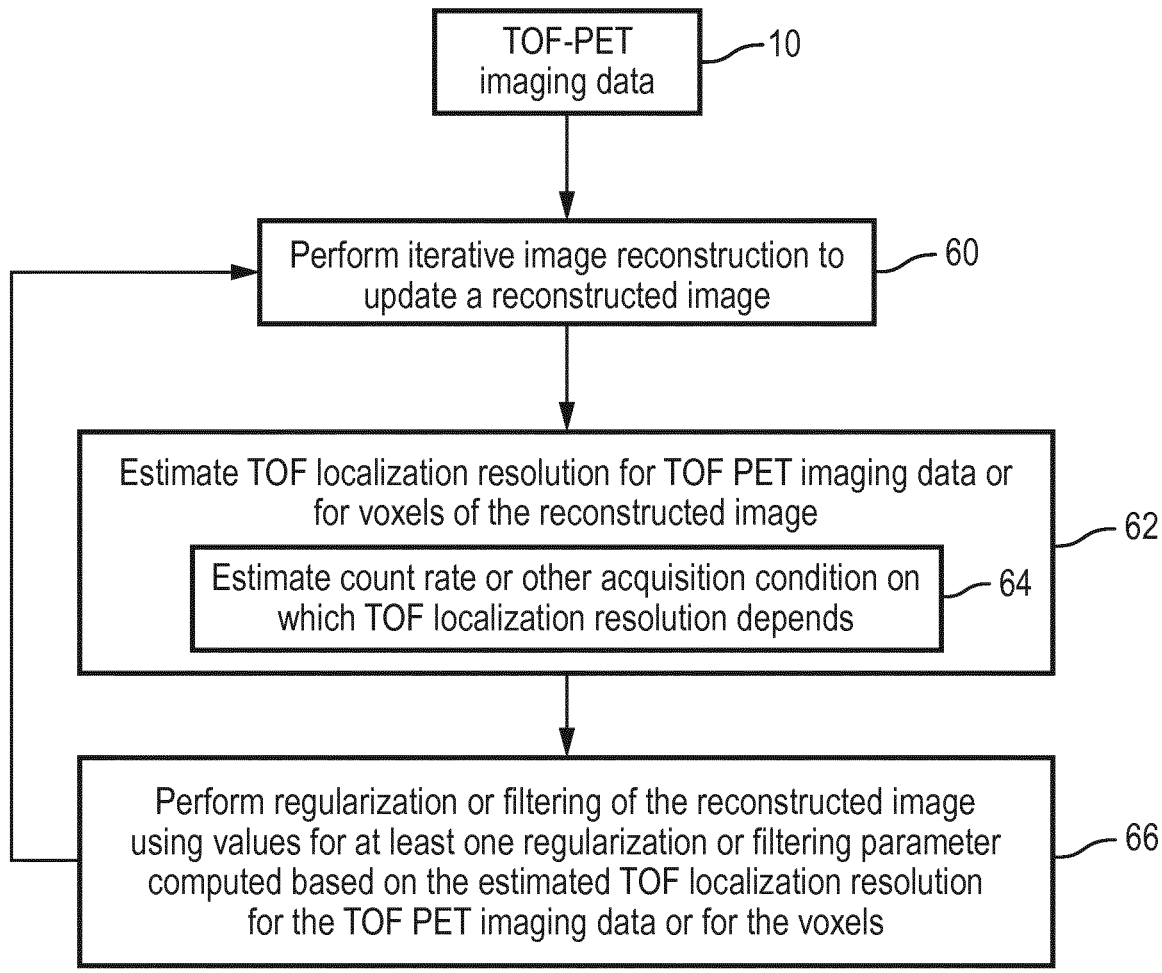
FIG. 9 diagrammatically shows an image reconstruction process suitably performed using the TOF PET imaging system of FIG. 1.

With reference to FIG. 9, an illustrative image reconstruction method is illustrated, which is suitably performed by the electronic processor 20 of the TOF PET imaging system of FIG. 1 to reconstruct the TOF PET imaging data 10. In an operation 60, iterative image reconstruction (i.e. image reconstruction 30 of FIG. 1) of the TOF PET imaging data 10 is performed with TOF localization of counts along respective LORs to iteratively update the reconstructed image 32. In an operation 62, TOF localization resolution is estimated for the TOF PET imaging data or for voxels of the reconstructed image. This entails an operation 64 of estimating count rate or another acquisition condition (e.g. detector temperature) on which the TOF localization resolution depends, and then applying a relation between the acquisition condition and TOF localization resolution. For example, FIG. 2 provides an illustrative relation in the case of the acquisition condition being count rate. In an operation 66, regularization or filtering of the reconstructed image is performed using values for at least one regularization or filtering parameter computed based on the TOF localization resolution for the TOF PET imaging data or for the voxels estimated in the operation 62. This process iterates, as indicated in FIG. 9 by the process flow returning to operation 60 to perform the next iteration. Also, as diagrammatically shown in FIG. 1 for the case of the regularization 34, in some embodiments the regularization or filtering operation 66 may be integrated with the iterative image reconstruction update 60.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An imaging device comprising:
a time of flight (TOF) positron emission tomography (PET) imaging data acquisition device including one or more radiation detector rings arranged to acquire TOF PET imaging data of an imaging subject;
a computer; and
a non-transitory storage medium storing instructions readable and executable by the computer to generate a TOF PET image by operations including:
performing iterative image reconstruction of the TOF PET imaging data to iteratively update a reconstructed image;
assigning values for at least one acquisition condition-dependent regularization or filtering parameter to the TOF PET imaging data or to voxels of the reconstructed image based on an estimated value of a corresponding acquisition condition for the TOF PET imaging data or voxels; and
performing regularization or filtering of the reconstructed image using the assigned values for the at least one acquisition condition-dependent regularization or filtering parameter
wherein the acquisition condition is count rate and the estimated value of the count rate is estimated by measuring a rate of counts acquired to form the TOF PET imaging data.

2. The imaging device of claim 1 wherein the TOF PET imaging data acquisition device further includes:
a support operative to move the imaging subject in an axial direction respective to the one or more radiation detector rings during acquisition of the TOF PET imaging data;
wherein the assigning comprises:
assigning the values for the at least one acquisition condition-dependent regularization or filtering parameter to the TOF PET imaging data based on acquisition time of the TOF PET imaging data; or
assigning the values for the at least one acquisition condition-dependent regularization or filtering parameter to the voxels of the reconstructed image based on axial position of the voxels in the reconstructed image.

3. The imaging device of claim 1 wherein the one or more radiation detector rings comprise a plurality of radiation detector rings spaced apart along an axial direction, and the assigning comprises:
assigning the values for the at least one acquisition condition-dependent regularization or filtering parameter to the TOF PET imaging data based on the radiation detector ring or rings acquiring the TOF PET imaging data; or assigning the values for the at least one acquisition condition-dependent regularization or filtering parameter to the voxels of the reconstructed image based on axial position of the voxels in the reconstructed image.

4. The imaging device of claim 1 wherein the assigning comprises:

assigning the values for the at least one count rate-dependent regularization or filtering parameter to the TOF PET imaging data based on acquisition time of the TOF PET imaging data; and assigning the value for the at least one count rate-dependent regularization or filtering parameter to each voxel of the reconstructed image based on an average acquisition time of TOF PET imaging data contributing to the voxel.

5. The imaging device of claim 4 wherein the assigning is further based on a half-life of a radioisotope administered to the subject preparatory to the acquisition of the TOF PET imaging data.

6. The imaging device of claim 4 wherein the acquisition of the TOF PET imaging data implements dynamic imaging and the assigning is further based on influx and washout timing of a radiopharmaceutical into and out of a target organ or tissue.

7. The imaging device of claim 1 wherein the assigning comprises assigning the values for the at least one count rate-dependent regularization or filtering parameter to produce (i) greater regularization or filtering for higher estimated count rates and (ii) less regularization or filtering for lower estimated count rates.

8. The imaging device of claim 1 wherein the performing of iterative image reconstruction of the TOF PET imaging data to iteratively update a reconstructed image comprises:

performing iterative ordered subset expectation maximization (OSEM) or Maximum Likelihood Estimation Method (MLEM) image reconstruction with TOF localization of counts along respective lines of response (LORs).

9. A non-transitory storage medium storing instructions readable and executable by an electronic data processing device to generate a time of flight (TOF) positron emission tomography (PET) image from TOF PET imaging data acquired of a subject using a TOF PET imaging data acquisition device by operations including:

performing iterative image reconstruction of the TOF PET imaging data with TOF localization of counts along respective lines of response (LORs) to iteratively update a reconstructed image;

assigning values for at least one regularization or filtering parameter to the TOF PET imaging data or to voxels of the reconstructed image based on an estimated TOF localization resolution for the TOF PET imaging data or voxels; and performing regularization or filtering of the reconstructed image using the assigned values for the at least one regularization or filtering parameter wherein the estimated TOF localization resolution is estimated based on count rate of counts acquired to form the TOF PET imaging data.

10. The non-transitory storage medium of claim 9 wherein the operations further include:

controlling the TOF PET imaging data acquisition device to acquire the TOF PET imaging data while concurrently controlling a support to move the imaging subject in an axial direction respective to one or more radiation detector rings of the TOF PET imaging data acquisition device;

wherein the assigning comprises:

assigning the values for the at least one regularization or filtering parameter to the TOF PET imaging data based on acquisition time of the TOF PET imaging data; or assigning the values for the at least one regularization or filtering parameter to the voxels of the reconstructed image based on axial position of the voxels in the reconstructed image.

11. The non-transitory storage medium of claim 9 wherein the TOF PET imaging data acquisition device includes a plurality of radiation detector rings spaced apart along an axial direction, and the assigning comprises:

assigning the values for the at least one regularization or filtering parameter to the TOF PET imaging data based on the radiation detector ring or rings acquiring the TOF PET imaging data; or assigning the values for the at least one regularization or filtering parameter to the voxels of the reconstructed image based on axial position of the voxels in the reconstructed image.

12. The non-transitory storage medium of claim 9 wherein the assigning comprises:

assigning the values for the at least one regularization or filtering parameter to the TOF PET imaging data based on acquisition time of the TOF PET imaging data; or assigning the value for the at least one regularization or filtering parameter to each voxel of the reconstructed image based on an average acquisition time of TOF PET imaging data contributing to the voxel.

13. The non-transitory storage medium of claim 12 wherein the assigning is further based on a half-life of a radioisotope administered to the subject preparatory to the acquisition of the TOF PET imaging data.

14. The non-transitory storage medium of claim 12 wherein the assigning is further based on influx and washout timing of a radiopharmaceutical into and out of a target organ or tissue during acquisition of the TOF PET imaging data.

15. The non-transitory storage medium of claim 9 wherein the iterative image reconstruction employs blobs comprising the regularization, and the assigning comprises assigning (i) larger values for a blob size parameter for poorer estimated TOF localization resolution and (ii) smaller values for the blob size parameter for greater estimated TOF localization resolution.

16. The non-transitory storage medium of claim 9 wherein the assigning comprises assigning the values for the at least one regularization or filtering parameter to produce (i) greater regularization or filtering for poorer estimated TOF localization resolution and (ii) less regularization or filtering for greater estimated TOF localization resolution.

17. A method comprising:

performing iterative image reconstruction of time of flight (TOF) positron emission tomography (PET) imaging data with TOF localization of counts along respective lines of response (LORs) to iteratively update a reconstructed image, the TOF PET imaging data being acquired by a TOF PET imaging data acquisition device;

estimating TOF localization resolution for the TOF PET imaging data or for voxels of the reconstructed image; and performing regularization or filtering of the reconstructed image using values for at least one regularization or filtering parameter computed based on the estimated TOF localization resolution for the TOF PET imaging data or for the voxels;

wherein the iterative image reconstruction, the estimation of TOF localization resolution, and the regularization or filtering are performed by a computer.

18. The method of claim 17 wherein the TOF localization resolution is estimated based on a count rate of the TOF PET imaging data.

19. The method of claim 17 wherein the TOF localization resolution is estimated based on an operating temperature of radiation detectors during the acquisition of the TOF PET imaging data.

20. The method of claim 17 wherein the iterative image reconstruction employs blobs comprising the regularization using values a blob size parameter computed based on the estimated TOF localization resolution for the TOF PET imaging data or for the voxels of the reconstructed image.

\* \* \* \* \*